//  Patented Aug. 26, 1952

UNITED STATES PATENT OFFICE 2,608,551

FUNGISTATIC COPOLYMERS OF BUTADIENE-1,3 AND ORGANIC NITRILES

Paul G. Benignus, Belleville, Ill., assignor to Monsanto Chemical Company, St. Louis, Mo., a corporation of Delaware No Drawing. Application September 28, 1949, Serial No. 118,470

1 Claim. (Cl. 260—79.5)

The present invention relates to compositions embodying copolymers of butadiene-1,3 compounds and organic nitriles copolymerizable therewith and more particularly to a process of rendering such copolymers fungistatic and to the products so produced.

Butadiene-1,3-acrylonitrile copolymers may be obtained commercially under a variety of trade names. They are plastic products which may be vulcanized with sulfur in much the same manner as rubber. However, they are chemically different from rubber and react different with rubber chemicals. For example, the curing they undergo on heating with sulfur is generally considered to be a further polymerization rather than the addition of sulfur to the polymer as is supposed to occur in the vulcanization of rubber.

In contrast to some synthetic elastomers and copolymers of butadiene-1,3 and acrylonitrile support fungus growths and are, therefore, objectionable for making sanitary garments and other objects in which it is desirable to have an elastomer having marked antiseptic, fungistatic or therapeutic properties. An object of this invention is to provide a class of materials for treating copolymers of butadiene-1,3 compounds and organic nitriles to impart fungistatic and antiseptic properties. Other and further objects will in part be apparent and in part particularly pointed out in the detailed description following.

In accordance with this invention it has been found that incorporating into a copolymer of a butadiene-1,3 compound and an organic nitrile a metal salt of 8-hydroxyquinoline prevents the growth of micro-organisms on the copolymer. Examples of typical metal salts which may be used include copper, zinc, iron, magnesium, manganese, cadmium, and aluminum salts. While as little as 0.1% by weight on the copolymer exhibits an appreciable effect, it is preferred that 1.5% to 3.5% by weight on the copolymer of a metal salt of 8-hydroxyquinoline be utilized. Amounts up to 5% may be used to advantage although amounts in excess of 5% generally show no increased benefit.

The present invention may be applied to any of the polymeric materials obtained by the copolymerization of a butadiene-1,3 compound, such as isoprene or dimethyl butadiene, with polymerizable nitriles. Typical examples of the latter include methacrylonitrile, bromoacrylonitrile, alpha-methyl-beta-bromoacrylonitrile, ethyl, beta-cyanocrotonate, alpha-phenyl-acrylonitrile, and alpha-chloroacrylonitrile and mixtures thereof.

As specific embodiments of the invention illustrative but not limitative thereof, stocks were compounded from copolymers of butadiene-1,3 and acrylonitrile containing about 2% of one of the preferred adjuvants, and compared to similar stocks containing none of the hydroxyquinoline salt. The composition of the stocks were as follows:

| | Stock—(Parts by Weight) | | | |
|---|---|---|---|---|
| | A | B | C | D |
| Copolymer of 55 parts butadiene-1,3 and 45 parts acrylonitrile | 100. | 100. | | |
| Copolymer of 75 parts butadiene-1,3 and 45 parts acrylonitrile | | | 100. | 100. |
| Carbon black | 40. | 40. | 40. | 40. |
| Zinc oxide | 5. | 5. | 5. | 5. |
| Dithio bis benzothiazole | 1.5 | 1.5 | 1.5 | 1.5 |
| Stearic acid | 0.5 | 0.5 | 0.5 | 0.5 |
| Sulfur | 1.5 | 1.5 | 1.5 | 1.5 |
| Hydrocarbon plasticizer | 20. | 20. | 20. | 20. |
| Copper-8-quinolinolate | | 3.44 | | 3.44 |

The stocks so compounded were cured by heating in the usual manner in a press for 30 minutes at 310° F. The physical properties of the cured products are set forth in the table below:

Table I

| Stock | Tensile at Break in lbs./in.$^2$ | Ultimate Elongation | Shore Hardness |
|---|---|---|---|
| A | 3,500 | 628 | 63 |
| B | 3,523 | 558 | 67 |
| C | 2,770 | 765 | 53 |
| D | 3,110 | 753 | 55 |

The data show that the presence of the copper salt of 8-hydroxy-quinoline (B and D stocks) imparted higher tensile strength and hardness. Thus, the preferred adjuvants do not detract from the physical properties of the vulcanization but actually improve them.

The fungistatic qualities of the stocks were examined by standard procedures. The culture medium consisted of the following ingredients:

12.0 g. bacto agar
0.3 g. KCl
0.3 g. MgSO$_4$ anhydrous
0.006 g. FeSO$_4$
1.2 g. KH$_2$PO$_4$
1.8 g. NH$_4$NO$_3$
18.0 g. dextrose—anhydrous
600.0 cc. distilled H$_2$O This medium contained in a 1,000 cc. flask stoppered with a cotton plug was cooked in an autoclave for 15 minutes at 15 pounds pressure. The flask was then removed and the pH of the agar adjusted to 5.5 after which the flask was again stoppered with a cotton plug and sterilized in an autoclave for 8 minutes. The flask was removed from the autoclave and after the agar had cooled slightly, 50 cc. portions were transferred to sterilized petri dishes by means of a sterile pipette.

After the media had jelled, dumbbell test samples of the elastomer were placed on the media in the petri dishes, three samples of each compound being placed in a separate petri dish marked for identification. The samples were then sprayed with spore suspensions of the following fungi:

*Aspergillus terreus*
*Aspergillus niger*
*Trichoderma viride*
*Penicillium citrinum*

The dishes were then placed in an incubator at 30° C. and inspected daily for rate of growth for 14 days.

A second fungus test was carried out by the same procedure except that the dextrose was omitted from the agar.

The results of these tests showed that while the control stocks (A and C) supported fungus growth in every case, stocks B and D containing the copper quinolinolate showed practically no fungus growth at all. Highly effective inhibition of fungus growth continued after 14 days incubation.

While the invention has been illustrated by reference to various specific examples, it will be appreciated that numerous modifications may be made without departing from the spirit or scope of the invention. Other accelerators, curatives, and compounding ingredients may be used where desired.

The invention is limited only by the claim attached hereto as part of the present specification.

What is claimed is:

A vulcanized elastomer obtained by heating a composition comprising 100 parts by weight of a copolymer containing 75 parts by weight of butadiene-1,3 and 45 parts by weight of acrylonitrile, 1.5 parts by weight of dithio bis benzothiazole, 1.5 parts by weight of sulfur and 3.44 parts by weight of copper 8-quinolinolate.

PAUL G. BENIGNUS.

REFERENCES CITED

The following references are of record in the file of this patent:

UNITED STATES PATENTS

| Number | Name | Date |
|---|---|---|
| 1,973,000 | Konrad et al. | Sept. 11, 1934 |
| 2,097,339 | Patterson et al. | Oct. 26, 1937 |
| 2,272,399 | Becher et al. | Feb. 10, 1942 |
| 2,381,863 | Benignus | Aug. 14, 1945 |
| 2,487,074 | Schulze et al. | Nov. 8, 1949 |